United States Patent [19]

Dave et al.

[11] Patent Number: 5,206,042
[45] Date of Patent: Apr. 27, 1993

[54] MANNITOL/SORBITOL ROLLING COMPOUND BLEND

[75] Inventors: Jayant C. Dave, Bloomingdale; Mansukh M. Patel, Downers Grove, both of Ill.

[73] Assignee: Wm. Wrigley Jr. Company, Chicago, Ill.

[21] Appl. No.: 948,458

[22] Filed: Sep. 21, 1992

Related U.S. Application Data

[63] Continuation of Ser. No. 761,278, Sep. 17, 1991, abandoned.

[51] Int. Cl.$^5$ .............................................. A23G 3/30
[52] U.S. Cl. .......................................... 426/5; 426/3; 426/658; 426/103; 426/289; 426/295
[58] Field of Search ........................................ 426/3-6, 426/103, 289, 295, 658

[56] References Cited

U.S. PATENT DOCUMENTS

| | | | |
|---|---|---|---|
| 3,784,714 | 1/1974 | McReynolds et al. | 426/171 |
| 4,238,510 | 12/1980 | Cherukuri et al. | 426/5 |
| 4,374,858 | 2/1983 | Glass et al. | 426/5 |
| 4,379,171 | 4/1983 | Furda et al. | 426/103 |
| 4,562,076 | 12/1985 | Arnold et al. | 426/103 |
| 4,976,972 | 12/1990 | Patel et al. | 426/3 |
| 4,988,518 | 1/1991 | Patel et al. | 416/5 |

FOREIGN PATENT DOCUMENTS 0160607 11/1985 European Pat. Off.
225608 8/1985 Fed. Rep. of Germany.

*Primary Examiner*—Joseph Golian
*Attorney, Agent, or Firm*—Willian Brinks Olds Hofer Gilson & Lione

[57] ABSTRACT

A rolling compound containing about 80-95 weight per cent mannitol and about 5-20 weight per cent sorbitol has improved flow and results in improved chewing gum quality. Initially, the sorbitol has been prepared into a fine powder that has a particle size distribution similar to that of mannitol. Chewing gum compositions which have been dusted with the rolling compound process well and possess excellent flavor and appearance.

19 Claims, 1 Drawing Sheet

MANNITOL/SORBITOL ROLLING COMPOUND BLEND

This application is a continuation of application Ser. No. 07/761,278, filed Sep. 17, 1991, now abandoned.

FIELD OF THE INVENTION

This invention relates to a rolling compound for dusting the surface of chewing gum, in order to prevent the chewing gum from sticking to gum forming equipment, gum wrapping equipment and gum wrappers.

BACKGROUND OF THE INVENTION

During the manufacture and processing of chewing gum, a chewing gum mass is removed from the mixing equipment and is cooled, extruded, formed and wrapped. Upon extrusion, the gum mass is formed into sticks, pellets or tabs. During forming the gum mass tends to stick to the forming equipment.

After forming, the chewing gum sticks are wrapped often using high speed wrapping equipment. Chewing gum has a tendency to stick both to the wrapping equipment and to the gum wrappers as the gum is kept in storage. Finally, chewing gum can stick to the fingers when unwrapped and handled.

For many years, it has been known to dust chewing gum with various substances both to reduce the stickiness and improve the flavor. The materials used to dust the chewing gum are referred to as "dusting compounds" or, alternatively, "rolling compounds", because the compounds are used to make the gum more manageable during processing including rolling and sheeting. For sugar type gum formulations, powdered sugar has excellent properties for use as a dusting agent or rolling compound. Freshly ground powdered sugar is very free flowing and handles easily in the processing equipment. If the powdered sugar is not freshly ground, a flow agent like starch may be added.

In the case of sugarfree gum, the most common rolling compound is powdered mannitol. Prior to the introduction of higher quality sugarfree gum, starch was used as a rolling compound to keep costs to a minimum. Mannitol costs more than starch, but gives a higher quality taste. Therefore, mannitol became preferred over starch as consumers of sugarfree gum became more quality conscious.

Powdered mannitol, however, is not as free flowing as starch. Therefore, other ingredients have been combined with powdered mannitol to improve its suitability for use in processing equipment. U.S. Pat. No. 4,562,076, issued to Arnold et al., discloses the use of thaumatin or monellin in combination with mannitol, sorbitol, sucrose, starch, calcium carbonate or talc, as a rolling compound. U.S. Pat. No. 4,988,518, issued to Patel et al., discloses the use of mannitol in combination with a liquid flavoring agent, as a rolling compound. U.S. Pat. No. 4,976,972, issued to Patel et al., discloses the use of mannitol in a rolling compound which is composed primarily of xylitol.

Among the most effective of flow agents for improving the flow of mannitol is magnesium silicate, commonly known as talc. A rolling compound blend of 93% by weight mannitol powder and 7% by weight talc has flow properties suitable for use in production equipment, and has been used successfully on a production scale. However, the use of talc has been hindered and discouraged due to potential regulatory problems.

Therefore, there is a need or desire in the chewing gum industry for rolling compounds which contain mannitol but not talc; and which have flow properties similar to the blend of 93% by weight mannitol and 7% by weight talc.

SUMMARY OF THE INVENTION

In accordance with the invention, there is provided a rolling compound blend which includes between about 80%-95% by weight mannitol and between about 5-20% by weight sorbitol, wherein the sorbitol particles have been selected or reduced in size such that the particle sizes of the mannitol and sorbitol are at least approximately similar to each other. Specifically, the sorbitol particles used in the invention are selected or modified such that at least 95% by weight of the sorbitol particles used in the rolling compound blend have at least one peripheral dimension which does not exceed 100 mesh, so that the particles can pass through a 100 mesh screen.

Preferably, at least 99% by weight of the sorbitol particles used in the invention have at least one peripheral dimension which does not exceed 100 mesh. Most preferably, at least 99.5% by weight of the sorbitol particles have at least one peripheral dimension which does not exceed 100 mesh.

Ordinarily, sorbitol might not be considered for use as a flow agent. Sorbitol is known to absorb moisture and become sticky and tacky. Furthermore, commercially available crystalline sorbitol generally has much larger particle sizes than mannitol, suggesting that relatively small amounts of sorbitol would contribute little or nothing to improving the flow of relatively larger amounts of mannitol. Accordingly, the present invention contemplates selecting or modifying the sorbitol particle sizes such as to approximate the size of the powdered mannitol particles. When this is done, it has been found that a blend of fine powdered sorbitol and powdered mannitol, in the invention concentrations, has flow properties which are similar to or better than the blend of 93% by weight mannitol and 7% by weight talc. By using fine powdered sorbitol instead of talc as the flow agent, the flavor of the chewing gum can also be improved.

With the foregoing in mind, it is a feature and advantage of the invention to provide a primarily mannitol containing rolling compound which has equal or better flow than the blend of 93% mannitol and 7% talc, but which does not contain talc.

It is also a feature and advantage of the invention to provide a primarily mannitol-containing rolling compound which contributes better flavor to chewing gum than the blend of 93% mannitol and 7% talc.

It is also a feature and advantage of the invention to provide chewing gum compositions, generally sugarfree, which do not stick to forming equipment, wrapping equipment, wrappers or fingers and which are coated with a primarily mannitol-containing, talc free rolling compound.

The foregoing and other features and advantages will become further apparent from the following detailed description of the presently preferred embodiments and the accompanying examples. It should be understandably that the detailed description and examples are illustrative rather than limitative, the scope of the invention being defined by the appended claims and equivalents thereof.

DETAILED DESCRIPTION OF THE PRESENTLY PREFERRED EMBODIMENTS

Figure 1:
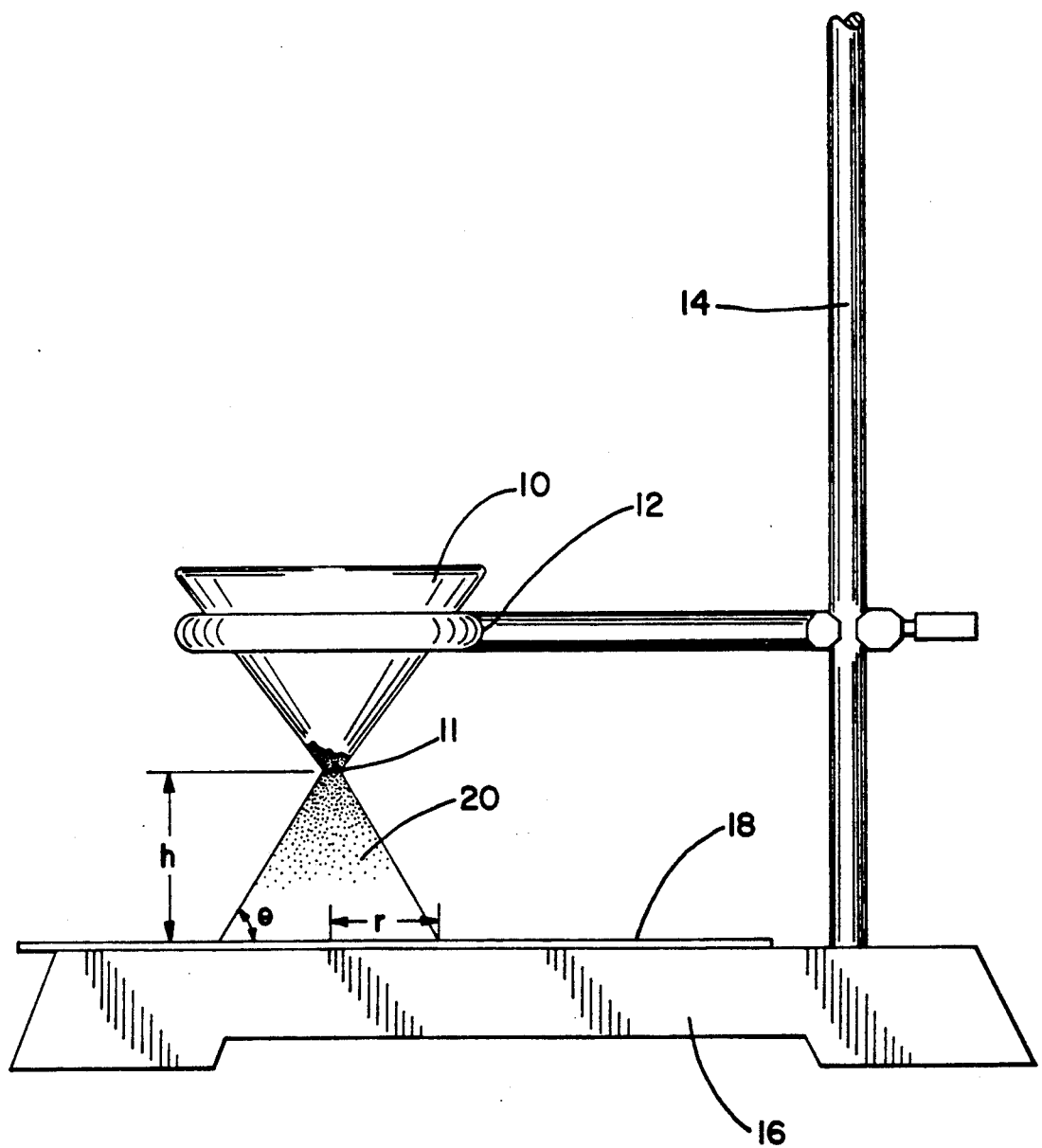
FIG. 1 shows an apparatus for measuring the angle of repose for a rolling compound blend.

The angle of repose test is a common technique for comparing the relative flowability (and hence, suitability) of different rolling compounds. Flowability improves as the angle of repose decreases. For a chewing gum rolling compound, an angle of repose of about 41 degrees or lower is preferred in order to possess the flow characteristics necessary to facilitate effective application and performance of the rolling compound. An angle of repose of about 39 degrees or lower is highly preferred.

FIG. 1 shows an apparatus for measuring the angle of repose of a rolling compound. A funnel 10 is mounted to a funnel ring holder 12 which is fastened to a laboratory stand including a vertical arm 14 and a horizontal support platform 16. A piece of notebook paper 18 is positioned on the platform 16 beneath the lower opening 11 in the funnel 10. The funnel 10 is mounted such that the lower opening 11 is about one inch above the paper 18.

The funnel 10 can be a standard conical-shaped laboratory funnel without a stem, constructed of Pyrex glass. The lower opening 11 in the funnel can have a diameter of about one quarter inch. The funnel 10 has a top diameter of 75 mm, or about three inches.

In order to measure the angle of repose, the rolling compound is slowly poured into the funnel 10 from a distance of about one-half inch above the funnel. The rolling compound can be poured from the jar (not shown). A pipe cleaner (not shown) can be used to obtain and maintain a constant flow from the jar.

As the rolling compound passes through the lower opening 11 in the funnel 10, it forms a pile 20 on the paper 18. The pile 20 resembles an inverted cone having a circular base. The rolling compound is poured into the funnel 10 until the pile 20 reaches the opening 11 such that the rolling compound will no longer flow through the opening 11.

When the rolling compound will no longer flow through the opening 11, a sharp pencil is used to trace the outline of the base of the pile 20. The rolling compound is removed from the paper, and the diameter of the traced outline is measured three times to obtain an average reading. The angle of repose, theta, is obtained from the following equation.

$$\tan(\theta) = \frac{h}{r}$$

where
h = 1 inch = the height of the conical pile, and
r = the radius of the conical pile.

A rolling compound containing 93 weight cent mannitol power and 7 weight percent talc has an angle of repose of about 39 degrees, indicating very good flow. When coarse powdered sorbitol crystal, unadjusted for particle size, is substituted in place of the talc in similar concentrations, the angle of repose of the mannitol/sorbitol blend is no better than about 41 degrees. When the sorbitol particle size is lowered to approximate the mannitol particle size, such as through selection or grinding, the angle of repose can be lowered significantly indicating flow characteristics similar to or better than the mannitol/talc blend.

In order to achieve the improved flow characteristics contemplated by the invention, the mannitol/sorbitol rolling compound blend will contain between 5-20 weight per cent fine powdered sorbitol and between 80-95 weight per cent powdered mannitol. Preferably, the rolling compound will contain about 10 weight per cent sorbitol and about 90 weight per cent mannitol.

The sorbitol particle size will be selected or adjusted such that at least 95 weight per cent of the sorbitol particles will have at least one peripheral dimension that does not exceed 100 mesh. Preferably, at least 99 weight per cent of the sorbitol particles will have a peripheral dimension not exceeding 100 mesh. Most preferably, at least 99.5 weight per cent of the sorbitol particles will have a peripheral dimension not exceeding 100 mesh. By "at least one peripheral dimension not exceeding 100 mesh", it is meant that particles fitting this description are able to pass through a 100 mesh screen.

In a highly preferred embodiment of the invention, at least 90 weight per cent of the sorbitol particles will have a peripheral dimension that does not exceed 140 mesh. Even more preferably, about 95 weight per cent of the sorbitol particles will have a peripheral dimension that does not exceed 140 mesh.

In a highly preferred embodiment of the invention, at least 65 weight per cent of the sorbitol particles will have a peripheral dimension that does not exceed 200 mesh. Even more preferably, about 70 weight per cent of the sorbitol particles will pass through a 200 mesh screen.

In a highly preferred embodiment, at least 33 weight per cent of the sorbitol particles will have at least on peripheral dimension that does not exceed 325 mesh. Even more preferably, about 37.5 weight per cent of the sorbitol particles will pass through a 325 mesh screen.

Crystalline sorbitol can be obtained from suppliers in a variety of particle sizes. However, commercially available sorbitol is typically characterized by particles which are much too coarse to be used with the invention. Coarse sorbitol typically imparts a sandy texture to chewing gum, resulting in poor mouth feel and taste. Sorbitol crystalline coarse powder is available from Pfizer, Inc. of New York or Roquette Corp. of Gurnee, Ill. A standard chewing gum sorbitol is Sorbitol NF/FCC Crystalline Powder, available from Pfizer, Inc.

A chewing gum composition generally includes a water soluble bulk portion, a water insoluble chewing gum base portion and one or more flavoring agents. The water soluble portion dissipates with the flavoring agents over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5–95% by weight of the chewing gum composition, more typically 10–50% by weight of the chewing gum, and most commonly 20–30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, glycyrrhizin, saccharin and its salts, cyclamic acid and its salts, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Flavoring agents should generally be present in the chewing gum in an amount within the range of about 0.1–10% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils and fruit essences, or clove oil, oil of wintergreen, anise and the like. Artificial flavoring agents and components may also be used. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

After the chewing gum mass has been thoroughly mixed, the rolling compound of the invention can be applied on a laboratory scale by sprinkling the rolling compound onto the chewing gum surface prior to rolling out the gum sample. During production, spreading equipment is used to apply and spread the rolling compound onto the gum surface as the gum is sheeted. It is important that the rolling compound have good flow characteristics in order to prevent plugging of the feed lines to the spreader and blocking of the feed holes. Good flow characteristics also allow the rolling compound to be more easily spread over the surface of the extruded gum sheets.

A wide range of changes modifications of the embodiments of the invention described above will be apparent to persons skilled in the art. The following examples are not to be construed as imposing limitations on the invention, but are included merely to illustrate preferred embodiments.

EXAMPLE 1

(Particle Sizes)

Sorbitol Crystalline Coarse Powder NF/FCC and a sample of sorbitol fine powder were obtained from Pfizer, Inc. A quantity of Mannitol F (powdered mannitol) was obtained from the Roquette Corp. The size distributions of the sorbitol coarse powder, sorbitol fine powder and mannitol were measured using screens.

The size distributions of the mannitol, sorbitol fine powder and sorbitol coarse powder are given below in Table 1.

TABLE I

| Screen Size | Particle Size Distribution (Weight %) | | |
|---|---|---|---|
| | Powdered Mannitol | Sorbitol Fine Powder | Sorbitol Coarse Powder |
| On 60 mesh | 0.3% | 0.2% | 37.2% |
| Through 60 mesh, on 100 mesh | 0.8% | 0.1% | 34.1% |
| Through 100 mesh, on 140 mesh | 3.5% | 4.2% | 16.8% |
| Through 140 mesh, on 200 | 11.6% | 25.7% | 7.2% |

TABLE I-continued

| Screen Size | Particle Size Distribution (Weight %) | | |
|---|---|---|---|
| | Powdered Mannitol | Sorbitol Fine Powder | Sorbitol Coarse Powder |
| mesh | | | |
| Through 200 mesh, on 325 mesh | 50.2% | 32.3% | 2.7% |
| Through 325 mesh | 33.6% | 37.5% | 2.0% |

The particle size distribution of the sorbitol fine powder was similar to that of powdered mannitol, and much smaller than that of crystalline sorbitol coarse powder. For both the mannitol and fine sorbitol powders, greater than 95 weight per cent of the particles were able to pass through both a 100 mesh screen and a 140 mesh screen.

EXAMPLE 2

(Angels Of Repose)

Various rolling compound blends were prepared using the powdered mannitol, sorbitol fine powder and sorbitol coarse powder of Example 1. A blend of 93 weight per cent powdered mannitol and 7 weight per cent talc was used for comparison. The angles of repose for each of the prepared samples were measured using the procedure set forth hereinbefore in the specification. The specific compositions of the samples, and the angles of repose, are set forth below in Table 2.

TABLE 2

| Sample No. | Composition (% By Weight) | | | | Angle of Repose (degrees) |
|---|---|---|---|---|---|
| | Powdered Mannitol | Talc | Sorbitol Fine Powder | Sorbitol Coarse Powder | |
| 1 | 93 | 7 | — | — | 39 |
| 2 | 95 | — | — | 5 | 42 |
| 3 | 90 | — | — | 10 | 41 |
| 4 | 80 | — | — | 20 | 41 |
| 5 | 70 | — | — | 30 | 45 |
| 6 | 60 | — | — | 40 | 51 |
| 7 | 90 | — | 10 | — | 37.5 |
| 8 | 80 | — | 20 | — | 41.8 |
| 9 | 70 | — | 30 | — | 43 |

None of the blends of powdered mannitol with sorbitol coarse powder had an angle of repose as low as the blend of 93% mannitol with 7% talc. However, the angles of repose improved when the fine powdered sorbitol was used. The blend of 90% mannitol with 10% fine powdered sorbitol had a lower angle of repose than the blend of 93% mannitol with 7% talc.

EXAMPLE 3

(Use With Chewing Gum)

The sample nos. 1, 7 and 8 from Example 2 were selected for evaluation as chewing gum rolling compounds. Initially, the following sugarfree chewing gum composition was prepared:

| Component | Weight Per Cent |
|---|---|
| Gum Base | 24.0 |
| Sorbitol | 49.58 |
| Mannitol | 8.0 |
| Glycerin | 7.3 |
| Coevaporated Lycasin/Glycerin | 9.2 |
| Spearmint flavor | 1.5 |
| Aspartame | 0.18 |

-continued

| Component | Weight Per Cent |
|---|---|
| Lecithin | 0.13 |
| 10% salt solution | 0.08 |
| Color | 0.03 |

The above composition was prepared in three separate batches to allow individual evaluation of the rolling compounds from Samples 1, 7 and 8 of Example 2. The rolling compounds were applied to the gum batches by hand sprinkling and spreading the rolling compound onto the gum. Following application of the rolling compound, each respective chewing gum batch was rolled, extruded into sheet and cut into slices.

During processing the gum batches coated with the rolling compounds of Samples 1, 7 and 8 all were easily handled with no significant differences. Sensory evaluations of the chewing gum samples using a trained panel of 24 persons indicated no statistically significant differences in product quality. However, in another test an expert panel of five persons noted that the sweetness and flavor quality of the chewing gum samples was higher for the chewing gum batches coated with the mannitol/fine sorbitol powder blends than for the chewing gum batch coated with the mannitol/talc blend. This indicates that fine sorbitol powder can be successfully used in place of talc in primarily mannitol containing rolling compound blends.

While the embodiments of the invention disclosed herein are presently considered to be preferred, various changes and modifications can be made without departing from the spirit and scope of the invention. The scope of the invention is indicated in the appended claims, and all changes that are within the meaning and range of equivalency are intended to be embraced therein.

We claim:

1. A rolling compound comprising a blend of about 5 to about 10 weight percent sorbitol and about 90 to about 95 weight percent mannitol, the sorbitol and mannitol having similar particle size distributions, the blend having an angle of repose of not greater than about 39 degrees.

2. The rolling compound of claim 1 comprising about 10 weight per cent sorbitol.

3. A chewing gum which has been dusted with the rolling compound of claim 1.

4. A rolling compound comprising a blend of powdered mannitol and about 5 to about 10 weight percent sorbitol, at least 95 weight percent of the sorbitol consisting of particles having at least one peripheral dimension that does not exceed 100 mesh, the blend having an angle of repose of not greater than about 39 degrees.

5. The rolling compound of claim 4 wherein at least 99 weight per cent of the sorbitol consists of particles having at least one peripheral dimension that does not exceed 100 mesh.

6. The rolling compound of claim 5 wherein at least 99.5 weight per cent of the sorbitol consists of particles having at least one peripheral dimension that does not exceed 100 mesh.

7. The rolling compound of claim 4 wherein at least 90 weight per cent of the sorbitol consists of particles having a peripheral dimension that does not exceed 140 mesh.

8. The rolling compound of claim 7 wherein about 95 weight per cent of the sorbitol consists of particles having a peripheral dimension that does not exceed 140 mesh.

9. The rolling compound of claim 4 wherein at least 65 weight percent of the sorbitol consists of particles having a peripheral dimension that does not exceed 200 mesh.

10. The rolling compound of claim 9 wherein about 70 weight per cent of the sorbitol consists of particles having a peripheral dimension that does not exceed 200 mesh.

11. The rolling compound of claim 4 wherein at least 33 weight per cent of the sorbitol consists of particles having a peripheral dimension that does not exceed 325 mesh.

12. The rolling compound of claim 11 wherein about 37.5 weight per cent of the sorbitol consists of particles having a peripheral dimension that does not exceed 325 mesh.

13. The rolling compound of claim 4 applied to a chewing gum composition.

14. A chewing gum composition which has been dusted with a blend of about 90 to about 95 weight percent mannitol and about 5 to about 10 weight percent sorbitol powders, the mannitol and sorbitol powders having particle size distributions such that greater than 95 weight percent of the mannitol particles and greater than 95 weight percent of the sorbitol particles have at least one peripheral dimension that does not exceed 100 mesh, the blend having an angle of repose of not greater than about 39 degrees.

15. The chewing gum composition of claim 14 wherein the mannitol and sorbitol powders have particle size ranges such that greater than 95 weight per cent of the mannitol particles and greater than 95 weight per cent of the sorbitol particles have at least one peripheral dimension that does not exceed 140 mesh.

16. The chewing gum composition of claim 14 wherein the blend of mannitol and sorbitol powders comprises about 80–95 weight per cent mannitol and about 5–20 weight per cent sorbitol.

17. The chewing gum composition of claim 16 wherein the blend of mannitol and sorbitol powders comprises about 10 weight per cent sorbitol.

18. A method of preparing a rolling compound for a chewing gum composition, comprising the steps of:
providing quantities of mannitol and sorbitol wherein at least 95 weight percent of the mannitol and at least 95 weight percent of the sorbitol can pass through a 100 mesh screen; and
blending about 90 to about 95 weight percent of the mannitol with about 5 to about 10 weight percent of the sorbitol to form a rolling compound having an angle of repose of not greater than about 39 degrees.

19. The method of claim 18 wherein about 90 weight per cent of the mannitol is blended with about 10 weight per cent of the sorbitol.

* * * * *

UNITED STATES PATENT AND TRADEMARK OFFICE
CERTIFICATE OF CORRECTION

PATENT NO. : 5,206,042  
DATED : April 27, 1993  
INVENTOR(S) : Jayant C. Dave et al.

It is certified that error appears in the above-indentified patent and that said Letters Patent is hereby corrected as shown below:

In column 2, lines 47 and 48, delete "mannitol containing" and substitute therefor --mannitol-containing--.

In column 2, lines 64 and 65, delete "understandably" and substitute therefor --understood--.

In column 3, line 60, delete "power" and substitute therefor --powder--.

In column 4, line 34, after "least" delete "on" and substitute therefor --one--.

In column 6, line 40, before "modifications" insert --and--.

In column 7, line 20, in the heading under EXAMPLE 2, delete "Angels" and substitute therefor --Angles--.

UNITED STATES PATENT AND TRADEMARK OFFICE
CERTIFICATE OF CORRECTION

PATENT NO. : 5,206,042
DATED : April 27, 1993
INVENTOR(S) : Jayant C. Dave et al.

It is certified that error appears in the above-indentified patent and that said Letters Patent is hereby corrected as shown below:

In column 8, lines 28 and 29, delete "mannitol containing" and substitute therefor --mannitol-containing--.

Signed and Sealed this

Fifth Day of July, 1994

Attest:

BRUCE LEHMAN

*Attesting Officer*     *Commissioner of Patents and Trademarks*